US011236932B2

(12) United States Patent
Sonninen

(10) Patent No.: US 11,236,932 B2
(45) Date of Patent: Feb. 1, 2022

(54) EVAPORATOR AND A METHOD FOR VAPORIZING A SUBSTANCE IN AN EVAPORATOR

(71) Applicant: VAHTERUS OY, Kalanti (FI)

(72) Inventor: Jyrki Sonninen, Turku (FI)

(73) Assignee: VAHTERUS OY, Kalanti (FI)

( * ) Notice: Subject to any disclaimer, the term of this patent is extended or adjusted under 35 U.S.C. 154(b) by 80 days.

(21) Appl. No.: 16/465,359

(22) PCT Filed: Dec. 18, 2017

(86) PCT No.: PCT/FI2017/050907
§ 371 (c)(1),
(2) Date: May 30, 2019

(87) PCT Pub. No.: WO2018/115579
PCT Pub. Date: Jun. 28, 2018

(65) Prior Publication Data
US 2019/0282919 A1    Sep. 19, 2019

(30) Foreign Application Priority Data

Dec. 19, 2016  (FI) .................................... 20165987

(51) Int. Cl.
*F25B 39/02*     (2006.01)
*B01D 1/00*      (2006.01)
(Continued)

(52) U.S. Cl.
CPC ............ *F25B 39/02* (2013.01); *B01D 1/0094* (2013.01); *B01D 1/305* (2013.01); *F28D 9/005* (2013.01);
(Continued)

(58) Field of Classification Search
CPC ..... B01D 1/305; B01D 1/0094; F28D 9/0043; F28D 9/005; F28D 9/0006;
(Continued)

(56) References Cited

U.S. PATENT DOCUMENTS

| 7,472,563 B2 | 1/2009 | Knoll et al. |
| 2005/0063832 A1 | 3/2005 | Holtzapple et al. |

(Continued)

FOREIGN PATENT DOCUMENTS

| CN | 204648763 | 9/2015 |
| CN | 205505503 | 8/2016 |

(Continued)

OTHER PUBLICATIONS

Partial English Machine Translation: DE 10201010840: Accessed Nov. 2020.*

(Continued)

*Primary Examiner* — Tavia Sullens
(74) *Attorney, Agent, or Firm* — Nixon & Vanderhye P.C.

(57) ABSTRACT

An evaporator (1) for vaporizing a substance into its gaseous form, which comprises a cylindrical outer shell (2) and a plate pack (4) arranged inside the cylindrical shell in its lower part and a droplet separator (9) arranged above the plate pack. A recirculation of a substance to be vaporized is carried out by using flow guides (10a, 10b) arranged tightly between the plate pack and the outer shell and by an ejector pipe (13) arrangement comprising a collection pipe (11) arranged inside the outer shell.

2 Claims, 1 Drawing Sheet

(51) Int. Cl.
  *F28D 9/00* (2006.01)
  *F28D 21/00* (2006.01)
  *F28F 9/00* (2006.01)
  *B01D 1/30* (2006.01)

(52) U.S. Cl.
  CPC .......... *F28D 9/0006* (2013.01); *F28D 9/0043* (2013.01); *F28D 21/0017* (2013.01); *F28D 2021/0071* (2013.01); *F28F 9/005* (2013.01)

(58) Field of Classification Search
  CPC .......... F28D 21/0017; F28D 2021/0071; F28F 9/005; F25B 39/02
  See application file for complete search history.

(56) References Cited

U.S. PATENT DOCUMENTS

2006/0179875 A1    8/2006   Persson
2013/0319039 A1*  12/2013   Sonninen ................ F25B 39/02
                                                        62/515

FOREIGN PATENT DOCUMENTS

| DE | 20 2010 003 403 | 6/2010 |
| DE | 10 2010 010 840 | 9/2011 |
| EP | 2 843 324 | 3/2015 |
| GB | 560060 | 3/1944 |
| JP | 5733866 | 6/2015 |
| WO | 2012/107645 | 8/2012 |
| WO | 2016/077436 | 5/2016 |

OTHER PUBLICATIONS

International Search Report and Written Opinion of the ISA for PCT/FI2017/050907, dated Mar. 6, 2018, 14 pages.
Search Report for FI20165987, dated Jul. 19, 2017, 2 pages.

* cited by examiner

EVAPORATOR AND A METHOD FOR VAPORIZING A SUBSTANCE IN AN EVAPORATOR

This application is the U.S. national phase of International Application No. PCT/FI2017/050907 filed 18 Dec. 2017, which designated the U.S. and claims priority to FI Patent Application No. 20165987 filed 19 Dec. 2016, the entire contents of each of which are hereby incorporated by reference.

FIELD OF THE INVENTION

The present invention relates to an evaporator and a method for vaporizing a substance into its gaseous form in an evaporator according to the preambles of the independent claims presented below.

BACKGROUND OF THE INVENTION

Evaporators are devices used to turn the liquid form of a substance into its gaseous form.

One kind of evaporators known in the prior art comprise the plate pack functioning as an evaporator and the droplet separator fitted inside the same outer shell. The plate pack is arranged in lower part of the shell and the droplet separator is arranged above the plate pack. The task of the droplet separator is to ensure that refrigerant droplets are not carried to the compressor of the refrigerating machinery. A substance to be vaporized and a generated vapour can flow freely around the plate pack inside the outer shell.

Previously, it is also known evaporator droplet separator systems, where the amount of a substance to be vaporized has been reduced by making the plates of the plate pack in the shape of a semicircle. This kind of evaporator is presented e.g. in the publication U.S. Pat. No. 7,472,563. Alternatively, the amount of a substance to be vaporized has been reduced by arranging filler units inside the outer casing, between the outer casing and the plate pack, as described in the publication WO2012/107645. Both of the constructions comprise flow channels so that a substance to be vaporized and a generated vapour can also flow between the plate pack and the outer shell. However, the flow conditions may be difficult to manage and it may also affect heat exchange properties of the plate heat exchanger and the efficiency of the evaporator. Heat exchange efficiency of the flooded evaporators might also be limited when there is large difference of temperature between a heating substance and a substance to be vaporized in the operation conditions, especially when combined with low vaporization temperature of the substance to be vaporized.

SUMMARY OF THE INVENTION

It is an object of the present invention to reduce or even eliminate the above-mentioned problems appearing in prior art.

It is an object of the present invention to provide an evaporator, which is functionally efficient, economical, small in size and functionally reliable. Especially, it is an object to provide a flooded evaporator having improved heat exchange properties.

It is also an object of the invention to provide an evaporator which heat exchange efficacy remains good also in large difference of temperature between a heating substance and a substance to be vaporized in the operation conditions.

Further, it is an object of the present invention to provide a solution, where the amount of refrigerant or other substance to be vaporized is as small as possible.

In order to achieve among others the objects presented above, the invention is characterized by what is presented in the characterizing part of the enclosed independent claim.

Some preferred embodiments of the invention will be described in the other claims.

A typical evaporator according to the invention for vaporizing a substance into its gaseous form comprises at least
- an outer casing, which comprises a substantially horizontal cylindrical shell and substantially vertical end plates,
- an inlet connection for a substance to be vaporized for leading a substance to be vaporized into the outer casing,
- a plate pack functioning as an evaporator, which is arranged inside the outer casing, in its lower part,
- an inlet connection and an outlet connection for a heating substance for leading a heating substance into and out from the plate pack,
- an outlet connection for vaporized substance for leading the vaporized substance out of the outer casing from its upper part,
- flow guides or plates arranged inside the outer casing, between the cylindrical shell and the plate pack, which flow guides or plates are arranged tightly against the outer casing and the plate pack,
- a circulation pipe arrangement arranged to guide a substance to be vaporized from the collection pipe back into the outer casing though the inlet connection for a substance to be vaporized,
- a droplet separator, which is arranged inside the outer casing, above the plate pack, and
- at least one collection pipe having openings arranged above the flow guide inside the outer casing, and wherein the collection pipe is connected to the circulation pipe arrangement and arranged to suck a substance to be vaporized from the interior of the outer casing by using at least one ejector pipe arranged into the circulation pipe arrangement.

A typical method for vaporizing a substance into its gaseous form in an evaporator according to the invention comprises
- arranging a heating substance to flow between inlet connection and outlet connection for a heating substance inside the plate pack,
- leading a substance to be vaporized from the bottom of the outer casing into the outer casing to a space between the flow guides or plates,
- leading the vaporized substance out of the outer casing from its upper part, and
- sucking a part of the substance to be vaporized from interior of the outer casing by using at least one collection pipe arranged into the outer casing below the liquid level of the substance to be vaporized and at least one ejector pipe arranged into a circulation pipe arrangement and circulating the substance to be vaporized back into the bottom of the outer casing.

An evaporator according to the invention may be used for example as a flooded evaporator of refrigerating machinery and a thereto related droplet separator.

It has been found that the heat exchange properties of the evaporator can remarkably be improved by arranging a recirculation of a substance to be vaporized in the evaporator. The efficient recirculation of at least a part of a substance to be vaporized is carried out by using an ejector pipe arrangement and by arranging flow guides or plates on both sides of the plate pack. The flow of the substance to be vaporized through the evaporator increases by the circulation and the by-pass flow of the substance to be vaporized between the plate pack and the shell is eliminated by the flow guides or plates, i.e. the flow of a substance to be vaporized is forced through the plate pack. Therefore, the evaporator according to the invention has improved heat exchange properties. This is beneficial especially in evaporators which function in large difference of temperature between a heating substance and a substance to be vaporized, especially when combined with low vaporization temperature of the substance to be vaporized. Thus, the large difference of temperature may not limit the efficiency of the evaporator since the flow rate through the plate pack is increased in the evaporator of the present invention. In addition, the forced flow of the substance to be vaporized by the flow guides or plates improves the flow through the plate pack, which improves further the efficiency of the evaporator. The amount of refrigerant or other substance to be vaporized in the system may also be small since the flow guides or plates arranged tightly between the plate pack and the outer shell decrease the filling volume. The evaporator according to the invention may operate with increased capacity, where the size of the evaporator is not increased, i.e. it does not need more size than other known types of evaporators.

The presented construction is simple and suitable for the completely welded heat exchangers.

The recirculation of a substance to be vaporized is carried out by using an ejector pipe arrangement. An ejector pipe is arranged into the circulation pipe arrangement, i.e. the ejector pipe and collection pipe are within each other; the ejector pipe forms an inner pipe and the collector pipe forms an outer pipe. Typically, the ejector pipe is tapered toward to the end through which the refrigerant or other substance to be vaporized is fed into the circulation pipe, but the shaping of the ejector pipe is not limited to any specific structure. Typically, the ejector pipe is arranged at least partly inside the circulation pipe arrangement. The function of the ejector pipe is based on the drop of the pressure and so the substance to be vaporized can be sucked out from the interior of the outer shell through at least one collector pipe. The collector pipe functions as a suction pipe of the ejector pipe arrangement. This is a simple and easy way to arrange the recirculation for a substance to be vaporized. The ejector pipe arrangement comprises at least one ejector pipe arranged to the circulation pipe arrangement. In a typical embodiment of the invention one ejector pipe is arranged to the circulation pipe arrangement for arranging the recirculation of the substance to be vaporized, but the arrangement may comprise two or more ejector pipes arranged in parallel to the circulation pipe arrangement for performing more efficient recirculation. The ejector pipe construction to be used is dependent on the desired heat exchange efficiency and, of course, on the size of the evaporator.

An evaporator according to the invention is based on the structure of Plate&Shell-type heat exchanger. The evaporator comprises an outer casing and a plate pack arranged inside the outer casing. The outer casing comprises a substantially horizontal cylindrical shell and substantially vertical end plates. The term longitudinal direction of the outer casing or cylindrical shell used in this text typically means the horizontal direction. For example if the cylindrical shell of the outer casing is a straight circular cylinder, then its longitudinal direction is the same as the direction of the central axis of the cylinder in question. The plate pack is formed by arranging circular heat exchange plates on top of each other, which heat exchange plates are tightly welded to each other at openings therein and/or at the perimeters of the plates. Thus plate pairs are formed in the plate pack, in which the inner parts of the plate pairs are arranged in connection with the inlet connection and the outlet connection that are in connection with the plate pack. The plate pack functioning as an evaporator is mainly circular cylinder in shape, in which longitudinal direction is the longitudinal direction of the cylindrical shell. In other words, a plate pack formed by heat exchange plates arranged one on top of each other is arranged inside the cylindrical shell so that the longitudinal direction of the plate pack is the same as the longitudinal direction of the cylindrical shell.

Inlet and outlet connections of the plate pack side of the heat exchanger are usually placed in the ends of the heat exchanger and the flow connections of the shell side in the cylindrical shell. In an evaporator according to the invention, inlet connection and outlet connection are arranged through the end plate(s) of the outer casing for leading the heat exchange medium into and out from the plate pack. The inlet connection and outlet connection for a heating substance have been arranged in connection to inner parts of the plate pack, i.e. to inner parts of the plate pair of the plate pack, whereby a primary circuit of the plate heat exchanger is formed between the inlet connection and outlet connection of the heat exchange medium, whereby there are plate spaces of the primary circuit inside the plate pairs. In an evaporator according to the invention, inlet connection and outlet connection for a substance to be vaporized are typically arranged through the cylindrical shell of the outer casing, which connections are arranged in connection with the inside of the shell, that is the outside of the plate pack, whereby a secondary circuit of the plate heat exchanger is formed between the inlet connection and outlet connection of a substance to be vaporized/vaporized substance, whereby plate spaces of the secondary circuit are between adjacent plate pairs of the plate pack. In other words, a primary circuit of the heat exchanger is formed between the openings in the heat exchange plates and a secondary circuit between connections of the shell surrounding the plate pack, so that a primary side flow medium flows in every other plate space of the plate pack and a secondary side flow medium in every other plate space of the plate pack.

In an evaporator according to the invention the inlet connection for a substance to be vaporized is arranged on the bottom of the cylindrical shell. Typically, the inlet connection is arranged on the bottom part so that the substance to be vaporized is guided to a space between the flow guides or plates. The outlet connection of the vaporized substance is arranged on the upper part of the cylindrical shell, above the droplet separator.

Typically in an evaporator according to the invention, the outer casing functions as a pressure vessel.

In one embodiment of the invention the plate pack is substantially a circular cylinder, whereby the outer diameter of the plate pack is about 30-70% of the inner diameter of the cylindrical shell, preferably about 40-60%. The plate pack is typically situated to be acentric in relation to the cylindrical shell, in the lower part of the cylindrical shell. Typically, a length of the plate pack is substantially same as a length of the cylindrical shell.

A droplet separator is arranged above the plate pack. Typically, the droplet separator is arranged inside the outer casing, in its upper part, beneath the outlet connection for vaporized substance. This kind of structure provides a compact structure of the evaporator. The construction of the droplet separator is not limited, but it can be selected on the basis of the operation conditions and their requirements. In one embodiment of the invention the evaporator comprises a demister droplet separator. The demister can be filled with for example steel wool or a corresponding material generating as low a flow resistance as possible. In one embodiment of the invention the demister consists of one or several vapour permeable demister parts and a vapour impermeable part. In one embodiment of the invention the demister droplet separator comprises two superposed perforated plates or the like, the space between which is filled with highly gas-permeable steel wool or a corresponding material.

In one embodiment of the invention the gravitational droplet separator is installed approximately horizontally in the longitudinal direction of the cylindrical shell, but diagonally downwards toward the outer casing in the transverse direction of the cylindrical shell.

The components used in the evaporator according to the invention can be standard parts or otherwise commonly used, thus the manufacturing costs of the apparatus according to the invention can also be kept low.

An evaporator according to the invention comprises flow guides or plates arranged tightly on both sides of the plate pack, between the plate pack and the inner surface of the cylindrical shell. The flow guides or plates comprise a first end and a second end in a cross direction of the outer casing, the first ends of the flow guides are attached tightly to the plate pack and the second ends of the flow guides are attached tightly to the cylindrical shell. The flow guides or plates have a length, which is same as the length of the horizontal shell, i.e. the flow guides elongate from a first end plate of the outer casing to the second end plate of the outer casing. Thus, there is no by-pass flow of the substance to be vaporized between the plate pack and the flow guide or plate, and between the flow guide or plate and the outer casing. A flow of a substance to be vaporized is guided between the flow guides or plates into the plate pack without any by-pass flow and thus the forced flow through the plate pack also improves efficiency of the evaporator.

The structure of the flow guides or plates may vary. In some embodiments only a plate is arranged tightly between the inner surface of the outer casing and the plate pack for blocking the by-pass flow between the plate pack and the outer casing. According to an embodiment of the invention, the structure of the flow guides may be a common plate like structure with the seals. In one embodiment of the invention, the flow guides may be a filler unit which are arranged tightly between the plate pack and the outer shell. The filler unit may be manufactured from plastic, such a HDPE, LDPE, expanded polystyrene or a corresponding material, or it may be manufactured from metal, for example steel, such as carbon steel or stainless steel. In one embodiment of the invention the filler unit may be manufactured from several plates attached together. The aim of the filler units is to block the by-pass flow between the plate pack and the outer casing and also to reduce the liquid volume of the evaporator.

The liquid level of the substance to be vaporized may vary inside the cylindrical shell depending on e.g. the operating conditions. The liquid level of the substance to be vaporized, such as the refrigerant or other liquid to be vaporized, is advantageously adjusted to about the level of the diameter of the cylindrical shell, whereby the surface area of the substance to be vaporized is as large as possible and the production of vapour per surface area is as small as possible. The ascension speed of the vapour is thus also as small as possible, whereby the generated droplets travelling with the vapour more easily fall back down. Thus the droplet separation is made more efficient. In operation, a liquid level of a substance to be vaporized is substantially in a centre line of the cross section of the cylindrical outer casing, the upper part of the plate pack is above the liquid level.

Since the liquid level is substantially in a centre line of the cross section of the outer casing according to an embodiment of the invention, the flow guides or plates are arranged between the lower part of the plate pack and the outer casing, which lower part typically situated underneath the centre line of the cross direction of the plate pack.

According to an embodiment of the invention, at least one collection pipe having openings is arranged above the flow guide or plate inside the outer casing. The collection pipe is arranged below the liquid level of the substance to be vaporized. In a preferred embodiment of the invention, the evaporator comprises two collection pipes; one collection pipe arranged on both sides of the plate pack, thus the recirculation of a substance to be vaporized will be more efficient. According to an embodiment of the invention, more than two collection pipes are arranged inside the outer casing in a desired way, the number of the collection pipes can be selected freely depending on the application. The length of the collection pipe can vary, but typically the collection pipe extends in a longitudinal direction of the horizontal cylindrical shell from the first end plate towards the second end plate, preferably close to the second end plate. According to a preferred embodiment of the invention the collection pipe has length, which is substantially same as the length of the horizontal cylindrical shell and the collection pipe(s) is arranged substantially horizontally into the outer casing. Thus, the recirculation of the substance to be vaporized is efficient and advantageous for improving heat exchange properties of the evaporator.

A collection pipe comprises openings through which a substance to be vaporized is sucked from the interior of the outer casing. Typically, the collection pipe comprises openings substantially in the whole length of the collection pipe. The collection pipe may comprise at least one row of the openings, or the openings may be arranged all around the collection pipe. The shape and size of the openings can vary depending optimal circulation rate, for example the openings may be circular or oval shaped. Typically, the openings diameter may be e.g. 1-3 mm, preferably 1.5-2.5 mm.

The recirculation of a substance to be vaporized is carried out by using at least one ejector pipe, which is arranged into the circulation pipe arrangement. The connection pipe(s) are connected to the circulation pipe arrangement and further the circulation pipe arrangement is connected to the inlet for a substance to be vaporized. Collection pipes arranged in different sides of the plate pack are typically connected to each other prior to the circulation pipe connection.

An inlet flow of the substance to be vaporized is guided through the ejector pipe into the circulation pipe arrangement and through inlet connection for the substance to be vaporized into the outer casing of the evaporator.

The evaporator arrangement may also comprise means for adjusting a flow speed, such a valve or throttle, of the substance to be vaporized. The flow rate may be automatically adjustable or it may be adjustable manually.

The operating principle of the evaporator arrangement according to the invention with an ejector pipe arrangement is following a substance to be vaporized is led from the bottom of the outer casing into the outer casing to a space between the flow guides, where the flow is forced into the plate pack and through the plate pack, the vaporized substance is led out of the outer casing from its upper part, and a part of the substance to be vaporized is sucked from inside the outer casing by using at least one collection pipe arranged into the outer casing below the liquid level of the substance to be vaporized and by an ejector pipe arranged into a circulation pipe arrangement outside of the evaporator and the substance to be vaporized is circulated back into the bottom of the outer casing. The inlet flow of the substance to be vaporized is guided through the ejector pipe into the circulation pipe arrangement.

DESCRIPTION OF THE DRAWINGS

The invention will be described in more detail with reference to appended drawings, in which.

DETAILED DESCRIPTION OF THE INVENTION

Same reference signs have been used in the Figures for parts corresponding to each other.

Figure 1:
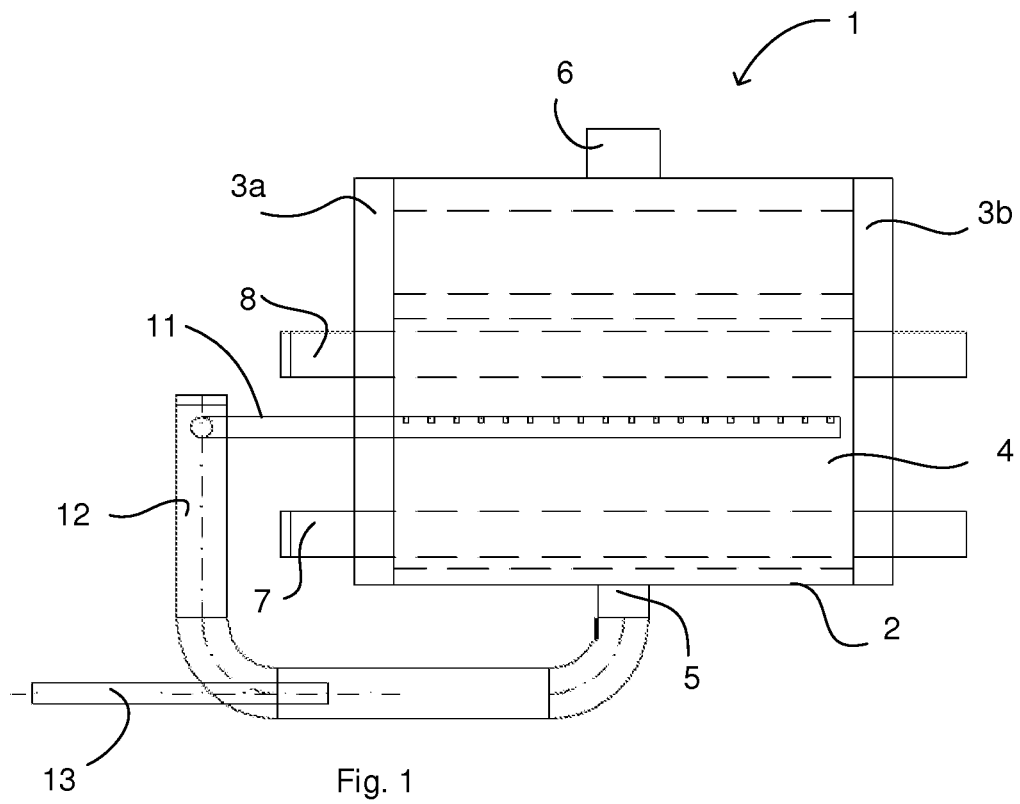
FIG. 1 shows a longitudinal cross-section of an evaporator according to an embodiment of the invention with recirculation arrangement.

FIG. 1 shows a longitudinal cross-section of an evaporator 1 according to an embodiment of the invention with a recirculation arrangement.

Figure 2:
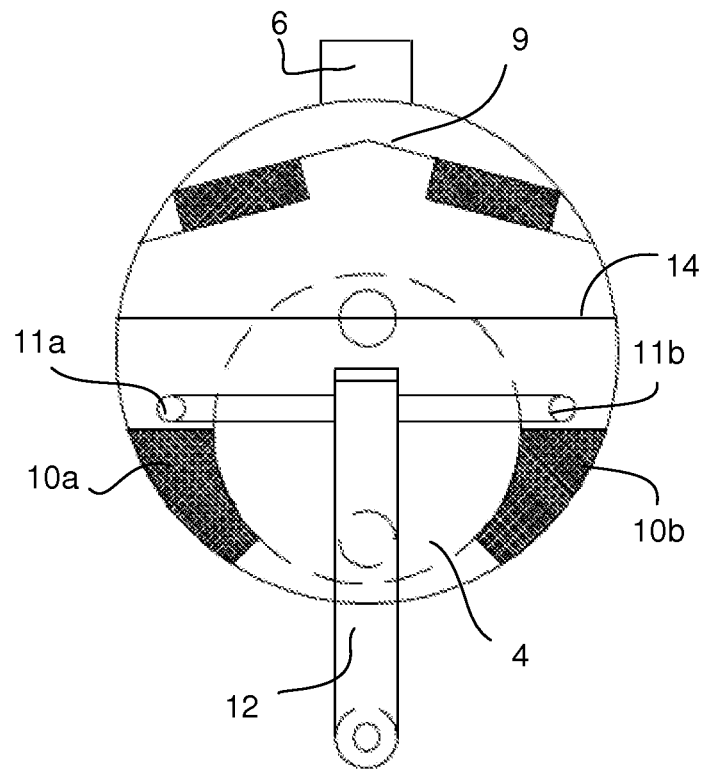
FIG. 2 shows a cross-section of an evaporator according to the invention.

The evaporator 1 comprises an outer casing, which is formed of a substantially horizontal cylindrical shell 2 and substantially vertical ends 3a, 3b. A plate pack 4 is arranged inside the cylindrical shell. The plate pack 4 is typically arranged in the lower part of the cylindrical shell and a droplet separator 9 is arranged above the plate pack at the upper part of the cylindrical shell. The plate pack 4 is formed by circular heat exchange plates arranged one on top of each other and the plate pack 4 is arranged inside the horizontal cylindrical shell 2 so that the longitudinal direction of the plate pack is the same as the longitudinal direction of the cylindrical shell. The outer surfaces of the plate pack 4 functions as heat exchange surfaces of the evaporator. FIG. 2 shows also filler unit type of flow guides 10a, 10b arranged between the outer casing of the cylindrical shell 2 and the plate pack 4. The flow guides 10a, 10b are designed such that they eliminate the by-pass flow between the plate pack and outer casing and also reduce the liquid volume of the evaporator part as much as possible. The construction of the flow guides is not limited to a shape presented in FIG. 2, but the flow guides might also be thin plate like structures arranged tightly between the plate pack 4 and the inner surface of the outer shell 2. An inlet connection 7 and an outlet connection 8 are arranged to lead heating substance into and out from the plate pack 4.

An inlet connection 5 for a substance to be vaporized is arranged at the bottom of the cylindrical shell 2 and the outlet connection 6 for the vaporized substance is arranged at the upper part of the cylindrical shell 2 above the droplet separator 9.

The liquid level 14 of a substance to be vaporized, such as the refrigerant or other liquid to be vaporized, is advantageously adjusted to the level of the diameter of the cylindrical shell (shown in the FIG. 2), whereby the surface area of the substance to be vaporized is as large as possible and the production of vapour per surface area is as small as possible. The ascension speed of the vapour is thus also as small as possible, whereby the generated droplets travelling with the vapour more easily fall back down. Thus, the gravitational droplet separation is made more efficient.

From the interior of the outer shell 2, i.e. from a shell side of the heat exchanger, a part of a substance to be vaporized is sucked into the circulation pipe 12 arrangement by using at least one collection pipe 11. At least one collection pipe 11 is arranged above the flow guide 10a, 10b inside the outer casing. Typically, the evaporator 1 comprises two collection pipes 11a, 11b; one collection pipe arranged on both sides of the plate pack 4 above the flow guide 10a, 10b. The collection pipe is arranged below the liquid level 14 of the substance to be vaporized. A collection pipe 11, 11a, 11b comprises openings through which a substance to be vaporized is sucked from the interior of the outer casing. Typically, the collection pipe 11, 11a, 11b comprises openings substantially in the whole length of the collection pipe. As shown in Figures, the collection pipe 11, 11a, 11b has typically a length, which is substantially same as the length of the horizontal cylindrical shell and the collection pipes are arranged substantially horizontally into the outer casing.

The collection pipe 11, 11a, 11b is arranged to guide a part of a substance to be vaporized to a circulation pipe arrangement 12 and back to the inlet connection 5 for a substance to be vaporized. The suction is performed by arranging an ejector pipe 13 at least partly inside the circulation pipe 12, i.e. the circulation pipe and the ejector pipe 13 are arranged within each other. The collection pipe(s) 11, 11a, 11b functions as a suction pipe of the ejector system. The inlet flow of substance to be vaporized is guided through the ejector pipe 13 of the evaporator system according to the invention.

Typically the evaporator 1 is a part of refrigerating machinery, in which it functions as a flooded evaporator and a thereto related droplet separator.

The vaporized substance is guided forward to the compressor from the upper part of the evaporator through the outlet connection 6. The figures do not show a connecting tube from evaporator to the compressor and a connector tube form the condenser to the circulation pipe. The refrigerant from the condenser is guided through the expansion valve into the ejector pipe 13.

The invention claimed is:

1. An evaporator for vaporizing a substance in a liquid form to thereby create a gaseous form of the substance, wherein the evaporator comprises at least:

an outer casing adapted to contain therewithin the substance in the liquid form, wherein the outer casing comprises a cylindrical shell having a horizontally oriented longitudinal dimension, and first and second vertically oriented end plates which close respective opposed first and second ends of the cylindrical shell, an inlet connection for introducing the substance in the liquid form into the outer casing and thereby establishing a liquid level of the substance in the liquid form within the outer casing, a plate pack which extends in the longitudinal direction of the cylindrical shell and is arranged inside a lower part of the outer casing, inlet and outlet ports for a heating substance each for respectively leading the heating substance into and out from the plate pack to vaporize the substance in the liquid form, an outlet connection for the gaseous form of the substance to lead the gaseous form of the substance out of an upper part of the outer casing, flow guides or plates arranged inside the outer casing between a lower portion of the cylindrical shell and a lower part of the plate pack on both sides of the plate pack, wherein the lower part of the plate pack is positioned under a center line of a crosswise direction of the plate pack, wherein the flow guides or plates comprise first and second ends each positioned in a cross-direction of the outer casing such that the first ends of the flow guides or plates are attached to the plate pack and the second ends of the flow guides or plates are attached to the cylindrical shell, a circulation pipe arrangement positioned so as to guide a part of the substance in the liquid form from inside the outer casing back into the outer casing through the inlet connection for the substance in the liquid form, at least one ejector pipe which is positioned at least partly within the circulation pipe arrangement, a droplet separator which is arranged inside the outer casing above the plate pack, and two collection pipes each being positioned on a respective side of the plate pack below the liquid level of the substance in the liquid form within the outer casing, wherein the collection pipes extend in the horizontally oriented longitudinal direction of the cylindrical shell from the first end plate towards the second end plate, the collection pipes having openings along an entire lengthwise extent thereof which are arranged above the flow guides or plates inside the outer casing, wherein the collection pipes are connected to the circulation pipe arrangement and are arranged to suck the substance in the liquid form from an interior of the outer casing by causing the substance in the liquid form to flow through the at least one ejector pipe positioned at least partly within the circulation pipe arrangement.

2. A method for vaporizing a substance in a liquid form to thereby create a gaseous form of the substance within an evaporator which comprises:

an outer casing adapted to contain therewithin the substance in the liquid form, wherein the outer casing comprises a cylindrical shell having a horizontally oriented longitudinal dimension, and first and second vertically oriented end plates which close respective opposed first and second ends of the cylindrical shell, an inlet connection for introducing the substance in the liquid form into the outer casing and thereby establishing a liquid level of the substance in the liquid form within the outer casing, a plate pack which extends in the longitudinal direction of the cylindrical shell and is arranged inside a lower part of the outer casing, inlet and outlet ports for a heating substance each for respectively leading the heating substance into and out from the plate pack to vaporize the substance in the liquid form, an outlet connection for the gaseous form of the substance to lead the gaseous form of the substance out of an upper part of the outer casing, flow guides or plates arranged inside the outer casing between a lower portion of the cylindrical shell and a lower part of the plate pack on both sides of the plate pack, wherein the lower part of the plate pack is positioned under a center line of a crosswise direction of the plate pack, wherein the flow guides or plates comprise first and second ends each positioned in a cross-direction of the outer casing such that the first ends of the flow guides or plates are attached to the plate pack and the second ends of the flow guides or plates are attached to the cylindrical shell, a circulation pipe arrangement positioned so as to guide a part of the substance in the liquid form from inside the outer casing back into the outer casing through the inlet connection for the substance in the liquid form, at least one ejector pipe which is positioned at least partly within the circulation pipe arrangement, a droplet separator which is arranged inside the outer casing above the plate pack, two collection pipes each being positioned on a respective side of the plate pack below the liquid level of the substance in the liquid form within the outer casing, wherein the collection pipes extend in the horizontally oriented longitudinal direction of the cylindrical shell from the first end plate towards the second end plate, wherein the collection pipes are connected to the circulation pipe arrangement and have openings along an entire lengthwise extent thereof which are arranged above the flow guides or plates inside the outer casing, wherein the method comprises the steps of:

(a) introducing the substance in the liquid form into the outer casing through the inlet connection to thereby establish the liquid level of the substance in the liquid form within the outer casing, (b) causing the heating substance to flow inside the plate pack between the inlet and outlet ports for the heating substance thereby vaporizing the substance in the liquid form, (c) leading the substance in the liquid form from the bottom of the outer casing into a space between the flow guides or plates within the outer casing, (d) leading the gaseous form of the substance out of the upper part of the outer casing, and (e) sucking a part of the substance in the liquid form from the interior of the outer casing through the collection pipes extending into the outer casing below the liquid level of the substance in the liquid form within the outer casing by causing the substance in the liquid form to flow through the at least one ejector pipe positioned at least partly within the circulation pipe arrangement and circulating the substance in the liquid form back into the bottom of the outer casing.

* * * * *